United States Patent
Chen

(10) Patent No.: US 9,857,910 B2
(45) Date of Patent: Jan. 2, 2018

(54) METHOD FOR CONTROLLING MULTIPLE TOUCHSCREENS AND ELECTRONIC DEVICE

(71) Applicant: Huawei Device (Dongguan) Co., Ltd., Dongguan (CN)

(72) Inventor: Lei Chen, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 14/905,174

(22) PCT Filed: Jan. 13, 2014

(86) PCT No.: PCT/CN2014/070536
§ 371 (c)(1),
(2) Date: Jan. 14, 2016

(87) PCT Pub. No.: WO2015/103789
PCT Pub. Date: Jul. 16, 2015

(65) Prior Publication Data
US 2016/0202832 A1   Jul. 14, 2016

(51) Int. Cl.
*G06F 3/041*   (2006.01)
*G06F 3/0488*   (2013.01)

(52) U.S. Cl.
CPC .......... *G06F 3/0416* (2013.01); *G06F 3/0418* (2013.01); *G06F 3/0488* (2013.01); *G06F 2203/04808* (2013.01)

(58) Field of Classification Search
CPC .... G06F 3/0418; G06F 3/0488; G06F 3/0416; G06F 3/0412; G06F 3/041; G06F 2203/04808
See application file for complete search history.

(56) References Cited

U.S. PATENT DOCUMENTS 8,259,080 B2 * 9/2012 Casparian ............ G06F 1/1616
345/173
8,836,654 B2 * 9/2014 Oguz ................... G06F 3/0484
345/173

(Continued)

FOREIGN PATENT DOCUMENTS

CN    101907990 A    12/2010
CN    102323875 A    1/2012
CN    103316472 A    9/2013

*Primary Examiner* — Tom Sheng
(74) *Attorney, Agent, or Firm* — Leydig, Voit & Mayer, Ltd.

(57) ABSTRACT

Embodiments of the present invention disclose a method for controlling multiple touch panels and an electronic device. The method includes: acquiring a first touch event by using a first touch panel, where the first touch event is input information that is triggered by a touch gesture on the first touch panel and is incompatible with an interface of third-party application software; when the electronic device detects that currently displayed application software is third-party application software, acquiring a first instruction corresponding to the first touch event, where the third-party application software is application software that is installed in the electronic device and is developed by a third party and not by a manufacturer of the electronic device; and running the third-party application software according to the first instruction. Embodiments of the present invention improve operation control efficiency of the touch panels of an electronic device.

15 Claims, 3 Drawing Sheets

(56) References Cited

U.S. PATENT DOCUMENTS

| | | | | |
|---|---|---|---|---|
| 9,001,158 B2* | 4/2015 | de Paz | ................ | G06F 1/1616 |
| | | | | 345/659 |
| 9,335,918 B2* | 5/2016 | Urushihata | ........... | G06F 3/0488 |
| 9,483,172 B2* | 11/2016 | Urawaki | .................. | G09G 5/14 |
| 2002/0084991 A1* | 7/2002 | Harrison | ............... | G06F 3/0488 |
| | | | | 345/173 |
| 2011/0032215 A1* | 2/2011 | Sirotich | ............... | G06F 3/0425 |
| | | | | 345/175 |
| 2011/0291946 A1* | 12/2011 | Mann | ................... | G06F 1/1626 |
| | | | | 345/173 |
| 2011/0291956 A1* | 12/2011 | Mann | ................... | G06F 1/1626 |
| | | | | 345/173 |
| 2011/0316802 A1* | 12/2011 | Choi | ...................... | G06F 3/041 |
| | | | | 345/173 |
| 2012/0242605 A1* | 9/2012 | Sato | ..................... | G06F 1/1616 |
| | | | | 345/173 |
| 2013/0093680 A1* | 4/2013 | Ogita | .................... | G06F 1/1626 |
| | | | | 345/168 |
| 2013/0100049 A1* | 4/2013 | Mochizuki | ........... | G06F 3/0483 |
| | | | | 345/173 |
| 2013/0100051 A1* | 4/2013 | Mochizuki | ........... | G06F 3/0483 |
| | | | | 345/173 |
| 2013/0321340 A1* | 12/2013 | Seo | ...................... | G06F 1/1641 |
| | | | | 345/174 |
| 2015/0160789 A1* | 6/2015 | Miyakawa | ........... | G06F 3/0481 |
| | | | | 715/768 |
| 2015/0261366 A1* | 9/2015 | Wong | ................... | G06F 1/1626 |
| | | | | 345/173 |
| 2016/0034132 A1* | 2/2016 | Huang | ................... | G06F 3/017 |
| | | | | 345/173 |
| 2016/0227022 A1* | 8/2016 | Alameh | ............... | G06F 1/1643 |

* cited by examiner

METHOD FOR CONTROLLING MULTIPLE TOUCHSCREENS AND ELECTRONIC DEVICE

CROSS-REFERENCE TO RELATED APPLICATION(S)

This application is a National Stage of International Application No. PCT/CN2014/070536, filed on Jan. 13, 2014, which is hereby incorporated by reference in its entirety.

TECHNICAL FIELD

The present invention relates to the field of mobile communications technologies, and in particular, to a method for controlling multiple touch panels and an electronic device.

BACKGROUND

An existing terminal device is already not limited to a touchscreen on a single side. There are already some terminal devices on the market that are provided with back touchscreens in addition to front touchscreens and support control of the terminals by the back touchscreens to facilitate user operation. In the prior art, to avoid a user misoperation, a back touch event reported by a back touchscreen is a predefined particular event, or a back touchscreen exclusively uses independent touch coordinate information different from that of a front touchscreen. The back touchscreen and the front touchscreen are touch input devices that are independent from each other, and the back touchscreen independently reports a touch event, to implement control of software.

However, for third-party application software developed for an ordinary mobile phone form having a single touchscreen, because the third-party application software can respond only to a system default touch event and cannot identify a particular event reported by a back touchscreen, the third-party application software cannot respond to an event reported by the back touchscreen. Therefore, a case like this may occur: when a terminal user runs some third-party application software developed for an ordinary mobile phone form having a single touchscreen, a back touchscreen cannot achieve effective control.

SUMMARY

To resolve a problem that a back touchscreen cannot perform effective control and management of some third-party application software, the present invention provides a method for controlling multiple touch panels and an electronic device.

According to a first aspect, the present invention provides an embodiment of a method for controlling multiple touch panels.

In a first possible implementation manner, the method includes:

acquiring, by an electronic device, a first touch event by using a first touch panel, where the first touch event is input information that is triggered by a touch gesture on the first touch panel and is incompatible with an interface of third-party application software;

when the electronic device detects that currently displayed application software is third-party application software, acquiring, by the electronic device, a first instruction corresponding to the first touch event, where the third-party application software is application software that is installed in the electronic device and is developed by a third party and not by a manufacturer of the electronic device; and running, by the electronic device, the third-party application software according to the first instruction.

With reference to the first possible implementation manner of the first aspect, in a second possible implementation manner, the detecting, by the electronic device, that currently displayed application software is third-party application software is specifically:

decrypting, by the electronic device, the currently displayed application software by using a public key that is preconfigured by the manufacturer of the electronic device and corresponds to a private key of a signature of dedicated application software, where the dedicated application software is application software developed by the manufacturer of the electronic device; and when a signature of the application software cannot be decrypted by using the public key, determining, by the electronic device, that the application software is third-party application software.

With reference to the first or second possible implementation manner of the first aspect, in a third possible implementation manner, the acquiring, by the electronic device, a first instruction corresponding to the first touch event is specifically:

converting, by the electronic device, the first touch event into a first event according to a preset rule, and acquiring the first instruction corresponding to the first event.

With reference to the third possible implementation manner of the first aspect, in a fourth possible implementation manner, the converting, by the electronic device, the first touch event into a first event according to a preset rule, and acquiring the first instruction corresponding to the first event is specifically:

receiving, by the electronic device, a user-defined setting, converting the first touch event into the user-defined first event, and acquiring the first instruction corresponding to the first event.

With reference to the third or fourth possible implementation manner of the first aspect, in a fifth possible implementation manner, the first event is specifically a second touch event; the second touch event is input information that is triggered by a touch gesture on a second touch panel of the electronic device and is compatible with the interface of the third-party application software; and the converting, by the electronic device, the first touch event into a first event according to a preset rule, and acquiring the first instruction corresponding to the first event is specifically:

converting, by the electronic device, the first touch event into the second touch event according to the preset rule, and acquiring the first instruction corresponding to the second touch event.

With reference to the third or fourth possible implementation manner of the first aspect, in a sixth possible implementation manner, the first event is specifically an event triggered by a physical button of the electronic device; and the converting, by the electronic device, the first touch event into a first event according to a preset rule, and acquiring the first instruction corresponding to the first event is specifically:

converting, by the electronic device according to the preset rule, an instruction triggered by the first touch event into an instruction triggered by the physical button of the electronic device, to acquire the instruction triggered by the physical button of the electronic device.

With reference to the first to sixth possible implementation manners of the first aspect, in a seventh possible implementation manner, the method further includes:

acquiring, by the electronic device, a second touch event by using the second touch panel, where the second touch event is input information that is triggered by a touch gesture on the second touch panel and is compatible with the interface of the third-party application software; and running, by the electronic device, the third-party application software according to the first instruction and the second touch event.

According to a second aspect, the present invention provides an embodiment of a method for controlling multiple touch panels.

In a first possible implementation manner, the method includes:

adding, by an electronic device, a registration interface, where the registration interface is used for registration by application software that needs to use a first touch panel; and when determining that a registration quantity of the registration interface is greater than or equal to 1, turning on, by the electronic device, the first touch panel.

According to a third aspect, the present invention provides an embodiment of an electronic device.

In a first possible implementation manner, the electronic device includes:

a first touch event acquiring module, configured to acquire a first touch event by using a first touch panel, where the first touch event is input information that is triggered by a touch gesture on the first touch panel and is incompatible with an interface of third-party application software;

a detection module, configured to detect whether currently displayed application software is third-party application software, where the third-party application software is application software that is installed in the electronic device and is developed by a third party and not by a manufacturer of the electronic device;

an instruction acquiring module, configured to: when the detection module detects that the currently displayed application software is third-party application software, acquire a first instruction corresponding to the first touch event; and a first processing module, configured to run the third-party application software according to the first instruction.

With reference to the first possible implementation manner of the third aspect, in a second possible implementation manner, the detecting, by the detection module, whether currently displayed application software is third-party application software is specifically:

decrypting, by the detection module, the currently displayed application software by using a public key that is preconfigured by the manufacturer of the electronic device and corresponds to a private key of a signature of dedicated application software; and when a signature of the application software cannot be decrypted by using the public key, determining that the application software is third-party application software, where the dedicated application software is application software developed by the manufacturer of the electronic device.

With reference to the first or second possible implementation manner of the third aspect, in a third possible implementation manner, the acquiring, by the instruction acquiring module, a first instruction corresponding to the first touch event is specifically:

converting, by the instruction acquiring module, the first touch event into a first event according to a preset rule, and acquiring the first instruction corresponding to the first event.

With reference to the third possible implementation manner of the third aspect, in a fourth possible implementation manner, the converting, by the instruction acquiring module, the first touch event into a first event according to a preset rule, and acquiring the first instruction corresponding to the first event is specifically:

receiving, by the instruction acquiring module, a user-defined setting, converting the first touch event into the user-defined first event, and acquiring the first instruction corresponding to the first event.

With reference to the third or fourth possible implementation manner of the third aspect, in a fifth possible implementation manner, the first event is specifically a second touch event; the second touch event is input information that is triggered by a touch gesture on a second touch panel of the electronic device and is compatible with the interface of the third-party application software; and the converting, by the instruction acquiring module, the first touch event into a first event according to a preset rule, and acquiring the first instruction corresponding to the first event is specifically:

converting, by the instruction acquiring module, the first touch event into the second touch event according to the preset rule, and acquiring the first instruction corresponding to the second touch event.

With reference to the third or fourth possible implementation manner of the third aspect, in a sixth possible implementation manner, the first event is specifically an event triggered by a physical button of the electronic device; and the converting, by the instruction acquiring module, the first touch event into a first event according to a preset rule, and acquiring the first instruction corresponding to the first event is specifically:

converting, by the instruction acquiring module according to the preset rule, an instruction triggered by the first touch event into an instruction triggered by the physical button of the electronic device, to acquire the instruction triggered by the physical button of the electronic device.

With reference to any one of the first to sixth possible implementation manners of the third aspect, in a seventh possible implementation manner, the electronic device further includes:

a second touch event acquiring module, configured to acquire a second touch event, where the second touch event is input information that is triggered by a touch gesture on the second touch panel and is compatible with the interface of the third-party application software; and a second processing module, configured to run the third-party application software according to the first instruction and the second touch event.

According to a fourth aspect, the present invention provides an embodiment of an electronic device.

In a first possible implementation manner, the electronic device includes:

a registration interface module, configured to add a registration interface, where the registration interface is used for registration by application software that needs to use a first touch panel;

a registration detection module, configured to detect whether an application software registration quantity of the registration interface is greater than or equal to 1; and a processing module, configured to: when the registration detection module detects that the registration quantity is greater than or equal to 1, turn on the first touch panel.

According to a fifth aspect, the present invention provides an embodiment of an electronic device.

In a first possible implementation manner, the electronic device includes: a processor, a memory, an output device, and at least two touch panels, where the processor performs the following steps:

acquiring a first touch event by using a first touch panel, where the first touch event is input information that is triggered by a touch gesture on the first touch panel and is incompatible with an interface of third-party application software;

when detecting that currently displayed application software is third-party application software, acquiring a first instruction corresponding to the first touch event, where the third-party application software is application software that is installed in the electronic device and is developed by a third party and not by a manufacturer of the electronic device; and running the third-party application software according to the first instruction.

With reference to the first possible implementation manner of the fifth aspect, in a second possible implementation manner, the detecting, by the processor, whether currently displayed application software is third-party application software is specifically:

decrypting the currently displayed application software by using a public key that is preconfigured by the manufacturer of the electronic device and corresponds to a private key of a signature of dedicated application software; and when a signature of the application software cannot be decrypted by using the public key, determining that the application software is third-party application software, where the dedicated application software is application software developed by the manufacturer of the electronic device.

With reference to the first or second possible implementation manner of the fifth aspect, in a third possible implementation manner, the acquiring, by the processor, a first instruction corresponding to the first touch event is specifically:

converting, by the processor, the first touch event into a first event according to a preset rule, and acquiring the first instruction corresponding to the first event.

With reference to the third possible implementation manner of the fifth aspect, in a fourth possible implementation manner, the converting, by the processor, the first touch event into a first event according to a preset rule, and acquiring the first instruction corresponding to the first event is specifically:

receiving, by the processor, a user-defined setting, converting the first touch event into the user-defined first event, and acquiring the first instruction corresponding to the first event.

With reference to the third or fourth possible implementation manner of the fifth aspect, in a fifth possible implementation manner, the first event is specifically a second touch event; the second touch event is input information that is triggered by a touch gesture on a second touch panel of the electronic device and is compatible with the interface of the third-party application software; and the converting, by the processor, the first touch event into a first event according to a preset rule, and acquiring the first instruction corresponding to the first event is specifically:

converting, by the processor, the first touch event into the second touch event according to the preset rule, and acquiring the first instruction corresponding to the second touch event.

With reference to the third or fourth possible implementation manner of the fifth aspect, in a sixth possible implementation manner, the first event is specifically an event triggered by a physical button of the electronic device; and the converting, by the processor, the first touch event into a first event according to a preset rule, and acquiring the first instruction corresponding to the first event is specifically:

converting, by the processor according to the preset rule, an instruction triggered by the first touch event into an instruction triggered by the physical button of the electronic device, to acquire the instruction triggered by the physical button of the electronic device.

With reference to any one of the first to sixth possible implementation manners of the fifth aspect, in a seventh possible implementation manner, the processor is further configured to:

acquire a second touch event, where the second touch event is input information that is triggered by a touch gesture on the second touch panel and is compatible with the interface of the third-party application software; and run the third-party application software according to the first instruction and the second touch event.

According to a sixth aspect, the present invention provides an embodiment of an electronic device. The electronic device includes: a processor, a memory, an input device, and an output device, where the processor performs the following steps:

adding a registration interface, where the registration interface is used for registration by application software that needs to use a first touch panel; and when the registration detection module detects that the registration quantity is greater than or equal to 1, turning on the first touch panel.

In the embodiments of the present invention, an electronic device acquires a touch event on at least one touch panel of multiple touch panels, and acquires an instruction corresponding to the touch event, thereby implementing effective control of third-party application software by the multiple touch panels, improving operation control efficiency of the touch panels of the electronic device, and improving user experience.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Embodiment 1

Figure 1:
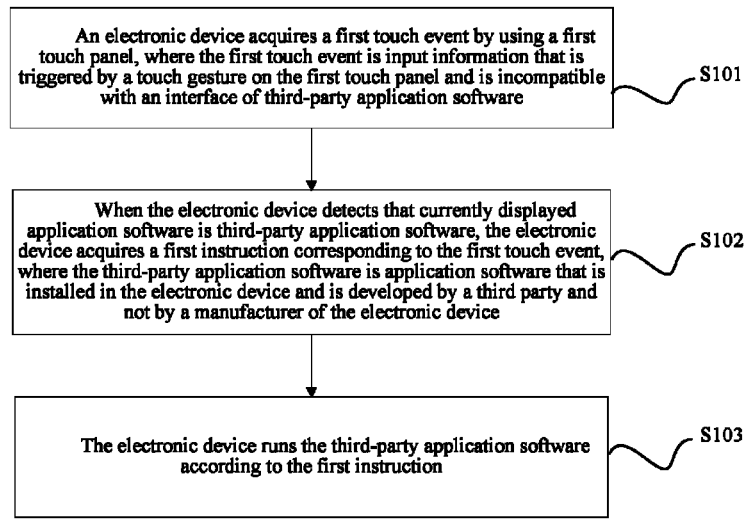
FIG. 1 is a method flowchart of an embodiment of a method for controlling multiple touch panels according to the present invention.

This embodiment of the present invention provides a method for controlling multiple touch panels. As shown in FIG. 1, the method includes:

S101: An electronic device acquires a first touch event by using a first touch panel, where the first touch event is input information that is triggered by a touch gesture on the first touch panel and is incompatible with an interface of third-party application software.

Multiple touch panels are disposed on the electronic device. For example, in addition to a touch panel disposed on the front of the electronic device, at least one other touch panel may be disposed on the back of the electronic device, or may be disposed on a side of the electronic device. The first touch panel is a touch panel of the electronic device excluding the front touch panel. The electronic device detects action input of a user on the first touch panel by using an electrical signal of a capacitor, a resistor, or the like of the first touch panel, and identifies the action input on the first touch panel as a corresponding first touchscreen event such as a touch event, a release event, or a slide or drag event according to different characteristics of the electrical signal. The first touchscreen event may include data or a signal that represents an event type and indicates a position at which the event occurs.

In a process in which the electronic device acquires a touch event generated by action input of the user on a touch panel and reports the touch event to application software, an operating system of the electronic device needs to provide an event interface, so that the application program can identify the corresponding touch event reported by using the event interface. Using an Android system as an example, event interfaces are explicitly defined in the Android system, and an existing Android system provides only a set of touch display event interfaces. In an electronic device having only one touch panel, an event reported by the touch panel of the electronic device is an event already defined in the Android system. If an electronic device includes at least two touch panels, for example, if an electronic device includes a front touch panel and a back touch panel, to avoid a user misoperation, a touch event triggered by action input on the front touch panel is usually compatible with a touch display event interface, and a manufacturer of the electronic device defines a touch event triggered by action input on the back touch panel, so that the front touch panel and the back touch panel perform effective control of application software that is installed in the electronic device before delivery. If third-party application software is installed in the electronic device, because the third-party application software cannot identify a particular event, which is defined by the manufacturer, on the back touch panel of the electronic device, the third-party application cannot effectively respond to input of a user on the back touch panel. In this embodiment of the present invention, the first touch event, which is acquired by the electronic device, on the first touch panel is input information that is incompatible with an interface of third-party application software installed in the electronic device, and the third-party application software cannot effectively respond to the first touch event.

S102: When the electronic device detects that currently displayed application software is third-party application software, the electronic device acquires a first instruction corresponding to the first touch event, where the third-party application software is application software that is installed in the electronic device and is developed by a third party and not by a manufacturer of the electronic device.

Specifically, the electronic device currently displays an application interface of application software running in the electronic device. For example, a display screen of the electronic device displays a particular application interface of a piece of particular application software. After acquiring the first touch event, the electronic device detects whether the application software running on the current application interface is third-party application software. For example, the terminal may decrypt the currently displayed application software by using a system default private key; when a signature of the application software cannot be decrypted by using the private key, the terminal determines that the application software is third-party application software; when a signature of the application software can be decrypted by using the private key, the terminal determines that the application software is application software that is developed by the manufacturer of the electronic device and not by a third party. In this embodiment of the present invention, the being developed by the manufacturer of the electronic device includes at least one of two states, namely, being developed by the manufacturer of the electronic device and being developed under the authorization of the manufacturer of the electronic device.

When the electronic device detects that the application software displayed on the current application interface is third-party application software, because an interface of the application software is incompatible with the first touch event acquired by using the first touch panel, the application software cannot effectively respond to the first touch event, and the electronic device acquires a first instruction corresponding to the first touch event. The electronic device can perform effective control of the application software according to the first instruction.

Optionally, the electronic device converts the first touch event into a first event according to a preset rule, and acquires the first instruction corresponding to the first event.

Optionally, the electronic device receives a user-defined setting, converts the first touch event into the user-defined first event, and acquires the first instruction corresponding to the first event.

Optionally, the first event is specifically a second touch event; the second touch event is input information that is triggered by a touch gesture on a second touch panel of the electronic device and is compatible with the interface of the third-party application software; and the converting, by the electronic device, the first touch event into a first event according to a preset rule, and acquiring the first instruction corresponding to the first event is specifically: converting, by the electronic device, the first touch event into the second touch event according to the preset rule, and acquiring the first instruction corresponding to the second touch event.

Optionally, the first event is specifically an event triggered by a physical button of the electronic device; and the converting, by the electronic device, the first touch event into a first event according to a preset rule, and acquiring the first instruction corresponding to the first event is specifically: converting, by the electronic device according to the preset rule, an instruction triggered by the first touch event into an instruction triggered by the physical button of the electronic device, to acquire the instruction triggered by the physical button of the electronic device.

S103: The electronic device runs the third-party application software according to the first instruction.

After the electronic device acquires the first instruction, the electronic device runs the third-party application software according to the first instruction.

In this embodiment of the present invention, an electronic device acquires a touch event on at least one touch panel of multiple touch panels, and acquires an instruction corresponding to the touch event, thereby implementing effective control of third-party application software by the multiple touch panels, improving operation control efficiency of the touch panels of the electronic device, and improving user experience.

In a possible implementation manner of this embodiment of the present invention, the detecting, by the electronic device, that currently displayed application software is third-party application software is specifically: decrypting, by the electronic device, the currently displayed application software by using a public key that is preconfigured by the manufacturer of the electronic device and corresponds to a private key of a signature of dedicated application software, where the dedicated application software is application software developed by the manufacturer of the electronic device; and when a signature of the application software cannot be decrypted by using the public key, determining, by the electronic device, that the application software is third-party application software.

Specifically, before releasing application software, a developer of the application software encrypts the application software by using a particular private key, to generate a digital signature of the application software. A holder of a public key corresponding to the particular private key can decrypt the digital signature of the application software and acquire information about the application software. In this implementation manner, the electronic device decrypts the currently displayed running application software by using a public key that is preconfigured by the manufacturer of the electronic device and corresponds to a private key of a signature of dedicated application software. When the electronic device is delivered from a factory, the manufacturer of the electronic device signs, by using a private key, application software developed by the manufacturer of the electronic device, and a public key corresponding to the private key of a signature of the application software developed by the manufacturer of the electronic device is preconfigured in the electronic device. The electronic device decrypts the running application software, which is displayed on the current application interface of the electronic device, by using the public key corresponding to the private key of the signature of the dedicated application software. When the running application software displayed on the current application interface can be decrypted by using the public key, the electronic device acquires information about the running application software displayed on the current application interface, and determines that the application software is dedicated application software that is developed by the manufacturer of the electronic device or developed under the authorization of the manufacturer of the electronic device rather than third-party application software. When the running application software displayed on the current application interface cannot be decrypted by using the public key, the electronic device determines that the running application software displayed on the current application interface is third-party application software.

In a possible implementation manner of this embodiment of the present invention, the acquiring, by the electronic device, a first instruction corresponding to the first touch event is specifically: converting, by the electronic device, the first touch event into a first event according to a preset rule, and acquiring the first instruction corresponding to the first event. When the electronic device acquires the first touch event by using the first touch panel and detects that the currently displayed application software is third-party application software, the electronic device converts the first touch event into a first event according to a characteristic of the application software. The first event is input information that is compatible with the interface of the third-party application software. For example, the first event may be an event triggered on a front touchscreen of the electronic device; or the first event may be an event triggered by a physical button of the electronic device. A user may implement a user-defined setting by directly pressing a physical button or a virtual button of the electronic device. For example, after the electronic device turns on the first touch panel, the system automatically associates some operations, for example, a tap operation within a fixed area, on the first touch panel with a volume decreasing button of the terminal by default. When running third-party application software developed for a terminal having a single touchscreen, the electronic device may automatically replace a tap operation event within the fixed area with an operation event on the associated volume decreasing button, that is, a tap operation of a user within a fixed area of the first touch panel is identified by the third-party application software as an operation on the volume decreasing button of the electronic device, thereby implementing control of the application software by the first touch panel. The electronic device acquires the first instruction of the user according to the first event.

Optionally, besides the electronic device automatically converting, according to the characteristic of the application software, the first touch event into the first event that can be identified by the application software, in a possible implementation manner of this embodiment of the present invention, the converting, by the electronic device, the first touch event into a first event according to a preset rule, and acquiring the first instruction corresponding to the first event may be specifically: receiving, by the electronic device, a user-defined setting, converting the first touch event into the user-defined first event, and acquiring the first instruction corresponding to the first event. For example, the electronic device provides a setting menu option. The setting menu option provides the user with a set of optional operations (such as slide up, slide down, tap or double tap within a fixed area, and touch and hold at a fixed coordinate position) on the first touch panel and a set of commonly used function buttons (such as a volume control button, a mute button, and a camera button) that can be identified by the application program, and provides options of associations between the set of operations on the first touch panel and the set of commonly used function buttons. The user may perform a user-defined setting according to an operation habit of the first touch panel. After receiving the user-defined setting, the electronic device converts the first touch event into an event triggered by a user-defined commonly used function button, and acquires an instruction corresponding to the event triggered by the commonly used function button.

In a possible implementation manner of this embodiment of the present invention, the first event is specifically a second touch event; the second touch event is input information that is triggered by a touch gesture on a second touch panel of the electronic device and is compatible with the interface of the third-party application software; and the converting, by the electronic device, the first touch event into a first event according to a preset rule, and acquiring the first instruction corresponding to the first event is specifically: converting, by the electronic device, the first touch event into the second touch event according to the preset rule, and acquiring the first instruction corresponding to the second touch event. For example, the second touch event is an event triggered by an operation of the user on the front touchscreen of the electronic device, after acquiring the first touch event by using the first touch panel, the electronic device converts the first touch event into the event triggered on the front touchscreen. For example, when the first touch panel and the front touchscreen have same resolution and the resolution is X*Y, the user acquires the first touch event by using the first touch panel, where reported coordinates of the first touch event are (x1, y1). In a touch panel design in which an upper-left corner is the origin of coordinates, the electronic device converts the first touch event into the second touch event, where reported coordinates of the first touch event may be (x2, y2), where x2=X−x1, and y2=y1. The conversion rule provided in this embodiment of the present invention is not limited to the rule herein, and this embodiment of the present invention may include another coordinate conversion rule.

Optionally, the first event may also be specifically an event triggered by a physical button of the electronic device; and the converting, by the electronic device, the first touch event into a first event according to a preset rule, and acquiring the first instruction corresponding to the first event is specifically: converting, by the electronic device according to the preset rule, an instruction triggered by the first touch event into an instruction triggered by the physical button of the electronic device, to acquire the instruction triggered by the physical button of the electronic device. The physical button is, for example, a volume control button, a mute button, or a camera button of the electronic device.

In the foregoing embodiment of the present invention, the method further includes: acquiring, by the electronic device, a second touch event by using the second touch panel, where the second touch event is input information that is triggered by a touch gesture on the second touch panel and is compatible with the interface of the third-party application software; and running, by the electronic device, the third-party application software according to the first instruction and the second touch event. For example, the electronic device may acquire a second touch event of a touch on the front touchscreen; the electronic device acquires a second instruction corresponding to the second touch event, and acquires the first instruction corresponding to the first touch event; and the electronic device runs the third-party application software according to the first instruction and the second instruction, thereby implementing convenient operation of the electronic device having multiple touch panels.

Embodiment 2

Figure 2:
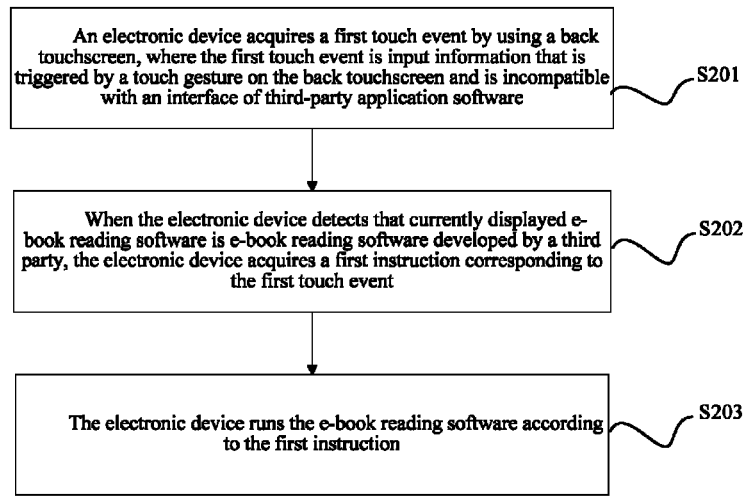
FIG. 2 is a method flowchart of an embodiment of a method for controlling multiple touch panels according to the present invention.

In an application scenario of this embodiment of the present invention, using a back touchscreen being a first touch panel as an example, a current application interface of the electronic device displays e-book reading software that currently runs on the electronic device and is developed by a third party. It should be understood that the back touchscreen in this embodiment of the present invention is merely a specific example and does not represent all cases of this embodiment of the present invention, and the first touch panel may also be a side touchscreen or other possible forms; the e-book reading software developed by the third party is also merely a specific example and does not represent all cases of this embodiment of the present invention, and the third-party application software may also be a browser, video play software, game software, or the like developed by a third party. The electronic device displays an application interface of video play software or some game software on a current interface, and especially for application software that has a low requirement on precision of a tap position and in which a user does not want some operations on a front touchscreen to block content displayed on an application interface, controlling the third-party application software by using the first touch panel located on the back or a side is obviously more convenient than performing an operation on a front touchscreen. In this embodiment of the present invention, as shown in FIG. 2, the method includes:

S201: An electronic device acquires a first touch event by using a back touchscreen, where the first touch event is input information that is triggered by a touch gesture on the back touchscreen and is incompatible with an interface of third-party application software.

The electronic device receives action input of a user on the back touchscreen, and identifies the action input as a corresponding back touch event according to different electrical signals generated by an input action.

S202: When the electronic device detects that currently displayed e-book reading software is e-book reading software developed by a third party, the electronic device acquires a first instruction corresponding to the first touch event.

Specifically, the electronic device runs e-book reading software, where the e-book reading software may be third-party application software such as 91 Panda Reader, Palm Reader, or Byread. Because an interface of the third-party e-book reading software is incompatible with the first touch event that is acquired by the electronic device by using the back, the e-book reading software cannot effectively respond to the first touch event, and the electronic device acquires a first instruction corresponding to the first touch event. The electronic device can perform effective control of the application software according to the first instruction.

Optionally, after reading the e-book reading program, the electronic device automatically associates, by default, a tap operation within a fixed area of the back touchscreen with an event triggered by a tap on a volume decreasing button of the electronic device, or may associate the tap operation with an event triggered by a tap on another physical button of the electronic device, or may associate the tap operation with a touch event on a front touchscreen of the electronic device. The first instruction may be an instruction triggered by a tap on the volume decreasing button or another physical button, or may be an instruction triggered by a touch event on the front touchscreen of the electronic device.

Optionally, the electronic device may receive a user-defined setting, and convert the back touch event into an event that can be identified by the e-book reading software. For example, when running the e-book reading software for e-book reading, the terminal may provide an option similar to "back touchscreen application" in a setting menu. The "back touchscreen application" option provides the user with options of associations between a set of back touchscreen operations and a set of commonly used function buttons of the terminal. The user may associate a tap event on the back touchscreen with an event that is triggered by a tap on a volume decreasing button and can be identified by the e-book reading software, or associate a slide event on the back touchscreen with an event triggered by a tap on a volume increasing button. The first instruction is an instruction triggered by a tap on a function button associated by the user.

S203: The electronic device runs the e-book reading software according to the first instruction.

After acquiring the first instruction, the electronic device implements control of the e-book reading software according to the first instruction.

In this embodiment of the present invention, an electronic device acquires a touch event on a back touchscreen, and acquires an instruction corresponding to the touch event, thereby implementing effective control, by the back touchscreen, of e-book reading software developed by a third party, improving operation control efficiency of the back touchscreen of the electronic device, and improving user experience.

In a possible implementation manner of this embodiment of the present invention, the electronic device converts the first touch event on the back touchscreen into a first event according to a preset rule, and acquires the first instruction corresponding to the first event. After acquiring the first touch event by using the back touchscreen, the electronic device may convert the first touch event into a first event, where the first event may be a touch event on the front touchscreen, or may be an event triggered by a physical button of the electronic device. After completing conversion of the back touch event, the electronic device acquires the first instruction corresponding to the first event. The electronic device reports the converted event to the e-book reading software, and the e-book reading software identifies the converted event and receives the first instruction corresponding to the converted event, to complete a corresponding operation, thereby implementing control of the e-book reading software by the back touchscreen.

In a possible implementation manner of this embodiment of the present invention, the electronic device may receive a user-defined setting, convert the first touch event, which is acquired by using the back touchscreen, into the user-defined first event, and acquire the first instruction corresponding to the first event. For example, the electronic device provides a setting menu option. The setting menu option provides the user with a set of optional operations (such as slide up, slide down, tap or double tap within a fixed area, and touch and hold at a fixed coordinate position) on the back touchscreen and a set of commonly used function buttons (such as a volume control button, a mute button, and a camera button) that can be identified by the e-book reading software, and provides options of associations between the set of operations on the back touchscreen and the set of commonly used function buttons. The user may perform a user-defined setting according to an operation habit of the back touchscreen. After receiving the user-defined setting, the electronic device converts the first touch event into an event triggered by a user-defined commonly used function button, and acquires an instruction corresponding to the event triggered by the commonly used function button.

In a possible implementation manner of this embodiment of the present invention, the electronic device converts the first touch event into a second touch event according to a preset rule, and acquires the first instruction corresponding to the second touch event. Specifically, the second touch event may be a touch event formed by a touch operation of the user on the front touchscreen. The electronic device converts a touch event at a particular coordinate position of the back touchscreen into a touch event at a corresponding coordinate position of the front touchscreen according to a preset conversion rule. The electronic device acquires the first instruction according to the touch event at the corresponding coordinate position of the front touchscreen, and runs the e-book reading software according to the first instruction.

In a possible implementation manner of this embodiment of the present invention, after the electronic device acquires a first touch event by using the first touch panel, the electronic device may further filter out an unnecessary first touch event. The unnecessary first touch event is a touch event that the application software cannot effectively respond to or that easily causes a misoperation. Using a back touchscreen being the first touch panel as an example, the electronic device may filter out an unnecessary back touch event, and report a necessary back touch event, where the unnecessary back touch event is a back touch event that the application software cannot effectively respond to. When the user uses the back touchscreen, in order to prevent the electronic device from identifying a misoperation on the back touchscreen as an instruction for the application software, the electronic device may filter out an unnecessary back touch event and report only a necessary back touch event. The unnecessary touch event is an event that causes a misoperation on the application software. The causing a misoperation on the application software refers to that input of the user on the back touchscreen cannot effectively implement control of the application software and instead causes a misoperation that does not meet an operation expectation of the user.

Optionally, if user input acquired by the electronic device is an operation track, the electronic device may filter out a back touch event triggered by an operation track whose track distance is less than or equal to a preset threshold, and report a back touch event triggered by an operation track whose track distance is greater than the preset threshold; and the electronic device converts the back touch event, which is triggered by the operation track whose track distance is greater than the preset threshold, into an event that can be identified by the application software. The back touch event triggered by an operation track whose track distance is less than or equal to a preset threshold is an unnecessary touch event, and the back touch event triggered by an operation track whose the track distance is greater than the preset threshold is a necessary touch event.

Specifically, in an application scenario of the implementation manner of this embodiment of the present invention, the electronic device runs a browser, where the browser may be a UC browser, a QQ browser, or the like. The electronic device may convert a tap event or a slide event on the back touchscreen into an event triggered by a physical button of the electronic device; the electronic device may also convert a tap event or a slide event on the back touchscreen into a tap event or a slide event on the front touchscreen. When the electronic device converts a tap event or a slide event on the back touchscreen into a tap event or a slide event on the front touchscreen, in order to avoid a misoperation of the user on the back touchscreen, the electronic device needs to perform screening and filtering on a back touch event reported by the back touchscreen, to filter out a back touch event that may cause a misoperation or filter out a back touch event that the application software cannot effectively respond to. When the back touchscreen acquires tap input, because the browser has a special requirement on tap precision, the electronic device may filter out an event triggered by the tap input, where a reason is that the tap input of the user may be a misoperation of the user when the user holds the electronic device, or may be that the user cannot acquire correct tap precision on the back touchscreen and therefore has poor user experience of the back touchscreen. Similarly, when the back touchscreen acquires an operation track whose slide distance is less than a threshold, the electronic device may filter out an event triggered by the operation track whose distance is less than a preset threshold, and report only an event triggered by an operation track whose distance is greater than a preset threshold, to achieve effective control of the browser by the back touchscreen.

In the foregoing implementation manner of this embodiment of the present invention, the method further includes: acquiring, by the electronic device, a second touch event by using the front touchscreen; and running, by the electronic device, the e-book reading software according to the first instruction and the second touch event. Before the electronic device acquires the first touch event by using the back touchscreen, or after the electronic device acquires the first touch event by using the back touchscreen, or when the electronic device acquires the first touch event by using the back touchscreen, the electronic device may acquire a second touch event of a touch on the front touchscreen. The electronic device acquires a second instruction corresponding to the second touch event, acquires the first instruction corresponding to the first touch event, and the electronic device runs the third-party application software according to the first instruction and the second instruction, thereby implementing convenient operation of the electronic device having multiple touch panels.

Embodiment 3

Figure 3:
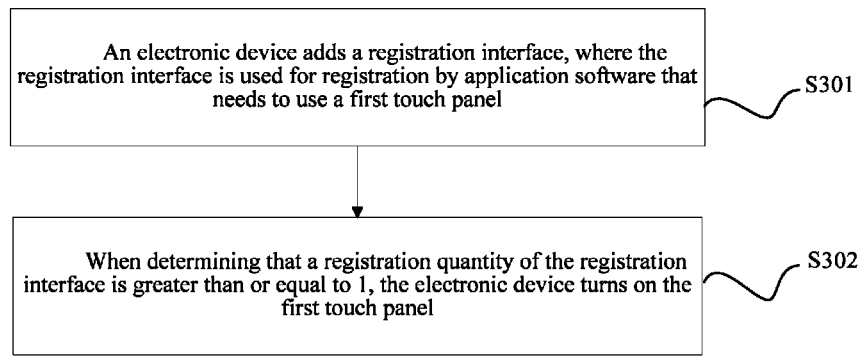
FIG. 3 is a method flowchart of an embodiment of a method for controlling multiple touch panels according to the present invention.

This embodiment of the present invention provides a method for controlling and managing a back touch event. As shown in FIG. 3, the method includes:

Step 301: An electronic device adds a registration interface, where the registration interface is used for registration by application software that needs to use a first touch panel.

Specifically, the electronic device provides a registration interface, used for registration by application software that needs to use a first touch panel. If the application software needs to use the first touch panel, the application software invokes the registration interface, and registers on the registration interface. The application software may be dedicated application software of the electronic device, that is, application software developed by a manufacturer of the electronic device or developed under the authorization of a manufacturer of the electronic device, or may be application software that is installed in the electronic device and developed by a third party; the third-party application software is application software that is installed in the electronic device and developed by a third party and not by the manufacturer of the electronic device. The first touch panel may be a back touchscreen of the electronic device, or may be a side touchscreen of the electronic device, or may include a touch panel in another possible design form.

In this embodiment of the present invention, the electronic device may acquire a first touch event by using the first touch panel, where the first touch event is input information that is triggered by a touch gesture on the first touch panel and is incompatible with an interface of third-party application software.

Step 302: When determining that a registration quantity of the registration interface is greater than or equal to 1, the electronic device turns on the first touch panel.

Specifically, when a registration quantity of the registration interface is greater than or equal to 1, the electronic device may run a power-on instruction for the first touch panel, to turn on the first touch panel, and the first touch panel receives and reports a touch event of a user on the touch panel. When a registration quantity of the registration interface is less than 1, the electronic device may run a power-off instruction for the first touch panel, to turn off the first touch panel, and the first touch panel does not respond to an operation of a user on the touch panel.

In this embodiment of the present invention, an electronic device provides a registration interface, used for registration by application software that needs to use a first touch panel, thereby performing power-on and power-off processing on the first touch panel. Intelligent turning on and off of the first touch panel are implemented without affecting normal use by a user, which reduces power consumption of the electronic device and improves user experience.

Embodiment 4

To facilitate better implementation of the foregoing solutions of the embodiments of the present invention, the following further provides related apparatuses configured to cooperatively implement the foregoing solutions.

Figure 4:
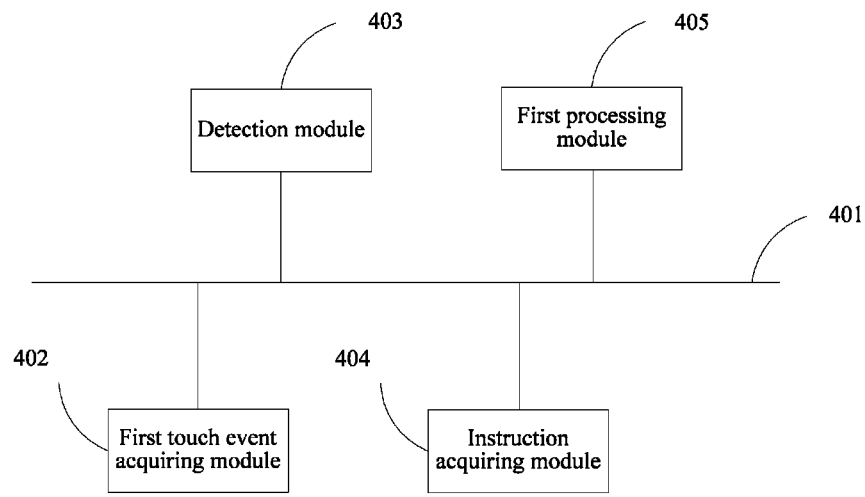
FIG. 4 is a schematic structural diagram of an embodiment of an electronic device according to the present invention.

Referring to FIG. 4, FIG. 4 shows an electronic device according to an embodiment of the present invention. The electronic device may include: a first touch event acquiring module 402, a detection module 403, an instruction acquiring module 404, and a first processing module 405.

The first touch event acquiring module 402 is configured to acquire a first touch event by using a first touch panel, where the first touch event is input information that is triggered by a touch gesture on the first touch panel and is incompatible with an interface of third-party application software;

the detection module 403 is configured to detect whether currently displayed application software is third-party application software, where the third-party application software is application software that is installed in the electronic device and is developed by a third party and not by a manufacturer of the electronic device;

the instruction acquiring module 404 is configured to: when the detection module 403 detects that the currently displayed application software is third-party application software, acquire a first instruction corresponding to the first touch event; and the first processing module 405 is configured to: after the instruction acquiring module 404 acquires the first instruction, run the third-party application software according to the first instruction.

In this embodiment of the present invention, the electronic device may further include a connection cable 401 that connects the first touch event acquiring module 402, the detection module 403, the instruction acquiring module 404, and the first processing module 405.

In this embodiment of the present invention, an electronic device acquires a touch event on at least one touch panel of multiple touch panels, and acquires an instruction corresponding to the touch event, thereby implementing effective control of third-party application software by the multiple touch panels, improving operation control efficiency of the touch panels of the electronic device, and improving user experience.

In a possible implementation manner of this embodiment of the present invention, the detecting, by the detection module, whether currently displayed application software is third-party application software is specifically: decrypting, by the detection module, the currently displayed application software by using a public key that is preconfigured by the manufacturer of the electronic device and corresponds to a private key of a signature of dedicated application software; and when a signature of the application software cannot be decrypted by using the public key, determining that the application software is third-party application software, where the dedicated application software is application software developed by the manufacturer of the electronic device.

In a possible implementation manner of this embodiment of the present invention, the acquiring, by the instruction acquiring module, a first instruction corresponding to the first touch event is specifically: converting, by the instruction acquiring module, the first touch event into a first event according to a preset rule, and acquiring the first instruction corresponding to the first event.

In a possible implementation manner of this embodiment of the present invention, the converting, by the instruction acquiring module, the first touch event into a first event according to a preset rule, and acquiring the first instruction corresponding to the first event is specifically: receiving, by the instruction acquiring module, a user-defined setting, converting the first touch event into the user-defined first event, and acquiring the first instruction corresponding to the first event.

In a possible implementation manner of this embodiment of the present invention, the first event is specifically a second touch event; the second touch event is input information that is triggered by a touch gesture on a second touch panel of the electronic device and is compatible with the interface of the third-party application software; and the converting, by the instruction acquiring module, the first touch event into a first event according to a preset rule, and acquiring the first instruction corresponding to the first event is specifically: converting, by the instruction acquiring module, the first touch event into the second touch event according to the preset rule, and acquiring the first instruction corresponding to the second touch event.

In a possible implementation manner of this embodiment of the present invention, the first event is specifically an event triggered by a physical button of the electronic device; and the converting, by the instruction acquiring module, the first touch event into a first event according to a preset rule, and acquiring the first instruction corresponding to the first event is specifically: converting, by the instruction acquiring module according to the preset rule, an instruction triggered by the first touch event into an instruction triggered by the physical button of the electronic device, to acquire the instruction triggered by the physical button of the electronic device.

In a possible implementation manner of this embodiment of the present invention, the electronic device further includes: a second touch event acquiring module, configured to acquire a second touch event, where the second touch event is input information that is triggered by a touch gesture on the second touch panel and is compatible with the interface of the third-party application software; and a second processing module, configured to run the third-party application software according to the first instruction and the second touch event.

In the foregoing embodiment of the present invention, the electronic device disclosed in the present invention may be manufactured as an independent apparatus, or may be integrated into various media data play apparatuses, such as a set top box, a mobile phone, a tablet computer (Tablet Personal Computer), a laptop computer (Laptop Computer), a multimedia player, a digital camera, a personal digital assistant (personal digital assistant, PDA for short), a navigation apparatus, a mobile internet device (Mobile Internet Device, MID), or a wearable device (Wearable Device). Persons skilled in the art may understand that a structure of an electronic device shown in FIG. 5 does not constitute a limitation on the terminal device, and the electronic device may include more components or fewer components than those shown in the figure, or some components may be combined, or a different component deployment may be used. The following specifically describes the components of the terminal device with reference to FIG. 5.

An input device 502 is configured to implement interaction between a user and the electronic device and/or information input into the electronic device. For example, the input device may receive number or character information entered by the user, to generate signal input related to a user setting or function control. In a specific implementation manner of the present invention, the input device may be a touch panel. The touch panel, which is also referred to as a touchscreen or a touch screen, can collect an operation action of a user on or near the touch panel, for example, an operation action of a user performed on the touch panel or at a position near the touch panel by using a finger, a stylus, or any other suitable object or accessory, and drive a corresponding connection apparatus according to a preset program. Optionally, the touch panel may include two parts: a touch detection apparatus and a touch controller. The touch detection apparatus detects a touch operation of a user, converts the detected touch operation into an electrical signal, and transmits the electrical signal to the touch controller. The touch controller receives the electrical signal from the touch detection apparatus, converts the electrical signal into coordinates of a touch point, and sends the coordinates to a processor. The touch controller may further receive a command sent by the processor, and execute the command. In addition, the touch panel may be a resistive touch panel, a capacitive touch panel, an infrared (Infrared) touch panel, a surface acoustic wave touch panel, or the like.

An output device 503 includes, but is not limited to, an image output device and a sound output device. The image output device is configured to output a text, a picture, and/or a video. The image output device may include a display panel, for example, a display panel configured in a form of a liquid crystal display (Liquid Crystal Display, LCD for short), an organic light-emitting diode (Organic Light-Emitting Diode, OLED for short), a field emission display (field emission display, FED for short), or the like. Alternatively, the image output device may include a reflective display, for example, an electrophoretic (electrophoretic) display, or a display using a technology of interferometric modulation of light (Interferometric Modulation of Light). The image output device may include a single display or multiple displays of different sizes. In a specific implementation manner of the present invention, a touch panel used in the input device may also be used as a display panel of the output device. For example, after detecting a touch gesture on or near the touch panel, the touch panel transmits the gesture to the processor to determine a type of a touch event, and then the processor provides corresponding visual input on the display panel according to the type of the touch event. The input device and the output device are used as two independent components to implement input and output functions of the electronic device, but the touch panel and the display panel may be integrated to implement the input and output functions of the electronic device. For example, the image output device may display various graphical user interfaces (Graphical User Interface, GUI for short) as virtual control components, which include but are not limited to a window, a scroll, an icon, and a scrapbook, so that a user performs an operation in a touch manner.

The processor 504 is the control center of the terminal device, and is connected to various parts of the entire computer by using various interfaces and lines. By running or executing a software program and/or an application unit stored in a memory and invoking data stored in the memory, the processor performs various functions of a station and processes data, thereby performing overall monitoring on the station.

The memory 505 may be configured to store a software program and a module. The processor runs the software program and the module that are stored in a storage unit, to implement various functional applications of the electronic device and implement data processing. The memory mainly includes a program storage area and a data storage area. The program storage area may store an operating system, an application program required by at least one function, such as a sound play program and an image display program. The data storage area may store data (such as audio data and an address book) created according to use of the electronic device and the like. In a specific implementation manner of the present invention, the memory may include a volatile memory, such as a nonvolatile dynamic random access memory (Nonvolatile Random Access Memory, NVRAM for short), a phase change random access memory (Phase Change RAM, PRAM for short), or a magnetoresistive random access memory (Magetoresistive RAM, MRAM for short), or may include a nonvolatile memory, such as at least one magnetic storage device, an electrically erasable programmable read-only memory (Electrically Erasable Programmable Read-Only Memory, EEPROM for short), or a flash memory, for example, a NOR flash memory (NOR flash memory) or a NAND flash memory (NAND flash memory). The nonvolatile memory stores an operating system and an application program that are executed by the processor. The processor loads a running program and data from the nonvolatile memory to a memory, and stores digital content in a large scale storage apparatus. The operating system is used for control and management of conventional system tasks, such as memory management, storage device control, and power management, and various components and/or drivers that facilitate communication between various types of software and hardware. In an implementation manner of the present invention, the operating system may be the Android system of the Google company, the iOS system developed by the Apple company, or the Windows operating system developed by the Microsoft company, or may be a built-in operating system such as Vxworks.

Figure 5:
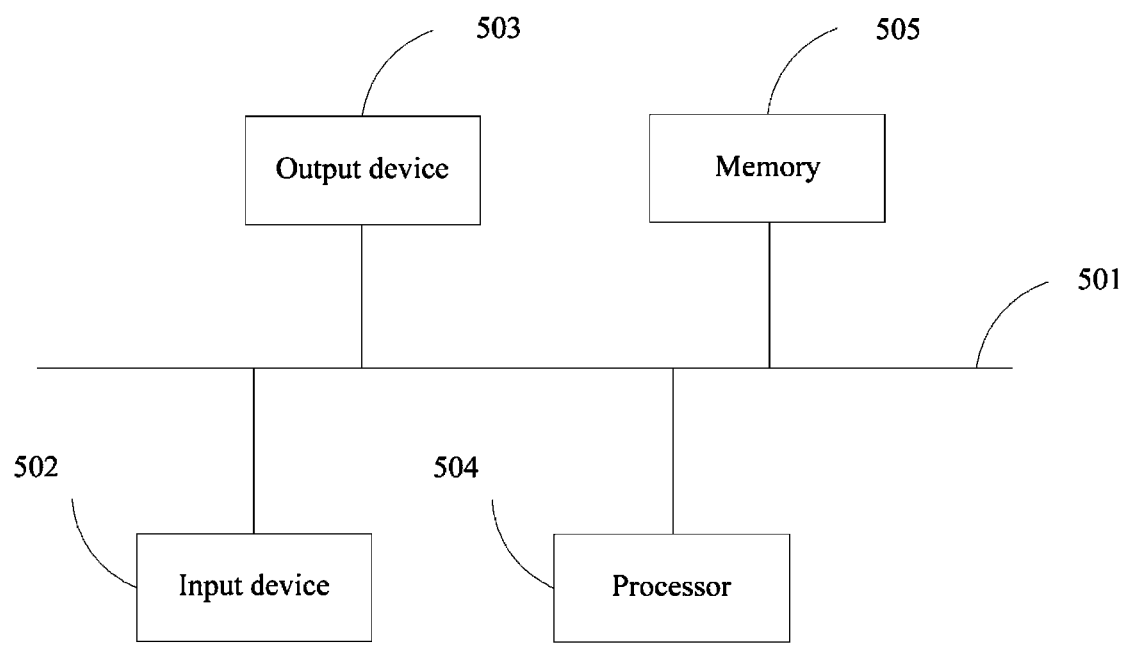
FIG. 5 is a schematic structural diagram of an embodiment of an electronic device according to the present invention.

As shown in FIG. 5, an embodiment of the present invention further provides an electronic device, including an input device 502 (in this embodiment of the present invention, the input device may be specifically a touch panel), an output device 503, a processor 504, a memory 505. The processor 502, the output device 503, the memory 505, and the touch panel may be connected to each other by using a communications bus 501 or may be connected to each other in another manner, and an example in which the processor 502, the output device 503, the memory 505, and the touch panel are connected to each other by using a bus is used in FIG. 5.

The processor 502 performs the following steps:

acquiring a first touch event by using a first touch panel, where the first touch event is input information that is triggered by a touch gesture on the first touch panel and is incompatible with an interface of third-party application software;

when detecting that currently displayed application software is third-party application software, acquiring a first instruction corresponding to the first touch event, where the third-party application software is application software that is installed in the electronic device and is developed by a third party and not by a manufacturer of the electronic device; and running the third-party application software according to the first instruction.

In this embodiment of the present invention, an electronic device acquires a touch event on at least one touch panel of multiple touch panels, and acquires an instruction corresponding to the touch event, thereby implementing effective control of third-party application software by the multiple touch panels, improving operation control efficiency of the touch panels of the electronic device, and improving user experience.

In a possible implementation manner of this embodiment of the present invention, the detecting, by the processor, whether currently displayed application software is third-party application software is specifically: decrypting the currently displayed application software by using a public key that is preconfigured by the manufacturer of the electronic device and corresponds to a private key of a signature of dedicated application software; and when a signature of the application software cannot be decrypted by using the public key, determining that the application software is third-party application software, where the dedicated application software is application software developed by the manufacturer of the electronic device.

In a possible implementation manner of this embodiment of the present invention, the acquiring, by the processor, a first instruction corresponding to the first touch event is specifically: converting, by the processor, the first touch event into a first event according to a preset rule, and acquiring the first instruction corresponding to the first event.

In a possible implementation manner of this embodiment of the present invention, the converting, by the processor, the first touch event into a first event according to a preset rule, and acquiring the first instruction corresponding to the first event is specifically: receiving, by the processor, a user-defined setting, converting the first touch event into the user-defined first event, and acquiring the first instruction corresponding to the first event.

In a possible implementation manner of this embodiment of the present invention, the first event is specifically a second touch event; the second touch event is input information that is triggered by a touch gesture on a second touch panel of the electronic device and is compatible with the interface of the third-party application software; and the converting, by the processor, the first touch event into a first event according to a preset rule, and acquiring the first instruction corresponding to the first event is specifically: converting, by the processor, the first touch event into the second touch event according to the preset rule, and acquiring the first instruction corresponding to the second touch event.

In a possible implementation manner of this embodiment of the present invention, the first event is specifically an event triggered by a physical button of the electronic device; and the converting, by the processor, the first touch event into a first event according to a preset rule, and acquiring the first instruction corresponding to the first event is specifically: converting, by the processor according to the preset rule, an instruction triggered by the first touch event into an instruction triggered by the physical button of the electronic device, to acquire the instruction triggered by the physical button of the electronic device.

In a possible implementation manner of this embodiment of the present invention, the processor is further configured to: acquire a second touch event, where the second touch event is input information that is triggered by a touch gesture on the second touch panel and is compatible with the interface of the third-party application software; and run the third-party application software according to the first instruction and the second touch event.

It should be noted that for corresponding technical characteristics in the foregoing embodiments, reference may be made to each other.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for controlling multiple touch panels, wherein the method comprises:
    acquiring, by an electronic device, a first touch event using a first touch panel, the electronic device including at least the first touch panel and a second touch panel, wherein the first touch event includes input information that is triggered by a touch gesture on the first touch panel and is incompatible with an interface of third-party application software, wherein the interface of the third party application software is compatible with input information triggered by a touch gesture on the second touch panel;
    detecting, by the electronic device, that currently displayed application software is the third-party application software;
    acquiring, by the electronic device, a first instruction corresponding to the first touch event, wherein the third-party application software is application software that is installed in the electronic device and is developed by a third party and not by a manufacturer of the electronic device; and
    running, by the electronic device, the third-party application software according to the first instruction.

2. The method according to claim 1, wherein the detecting, by the electronic device, that currently displayed application software is third-party application software includes:
    decrypting, by the electronic device, the currently displayed application software by using a public key that is preconfigured by the manufacturer of the electronic device and corresponds to a private key of a signature of dedicated application software, wherein the dedicated application software is application software developed by the manufacturer of the electronic device; and
    when a signature of the application software cannot be decrypted using the public key, determining, by the electronic device, that the application software is third-party application software.

3. The method according to claim 1, wherein the acquiring, by the electronic device, a first instruction corresponding to the first touch event includes:
    converting, by the electronic device, the first touch event into a first event according to a preset rule, and acquiring the first instruction corresponding to the first event.

4. The method according to claim 3, wherein the converting, by the electronic device, the first touch event into a first event according to a preset rule, and acquiring the first instruction corresponding to the first event includes:
    receiving, by the electronic device, a user-defined setting, converting the first touch event into a user-defined first event, and
    acquiring the first instruction corresponding to the user-defined first event.

5. The method according to claim 3, wherein the first event is a second touch event; the second touch event is input information that is triggered by a touch gesture on the second touch panel of the electronic device and is compatible with the interface of the third-party application software; and the converting, by the electronic device, the first touch event into a first event according to a preset rule, and acquiring the first instruction corresponding to the first event includes:
    converting, by the electronic device, the first touch event into the second touch event according to the preset rule, and acquiring the first instruction corresponding to the second touch event.

6. The method according to claim 3, wherein the first event is an event that is triggerable by a physical button of the electronic device; and the converting, by the electronic device, the first touch event into a first event according to a preset rule, and acquiring the first instruction corresponding to the first event includes:
    converting, by the electronic device according to the preset rule, an instruction triggered by the first touch event into an instruction that would be triggered by the physical button of the electronic device, to acquire the instruction that would be triggered by the physical button of the electronic device.

7. The method according to claim 1, wherein the method further comprises:
    acquiring, by the electronic device, a third touch event using the second touch panel, wherein the third touch event is input information that is triggered by a touch gesture on the second touch panel and is compatible with the interface of the third-party application software; and
    running, by the electronic device, the third-party application software according to the first instruction and the third touch event.

8. An electronic device comprising:
    a processor,
    a memory,
    an output device,
    a first touch panel, and
    a second touch panel,
    wherein the processor is configured to:
    acquire a first touch event using the first touch panel, wherein the first touch event is input information that is triggered by a touch gesture on the first touch panel and is incompatible with an interface of third-party application software, wherein the interface of the third party application software is compatible with input information triggered by a touch gesture on the second touch panel;

detect that currently displayed application software is the third-party application software;

acquire a first instruction corresponding to the first touch event, wherein the third-party application software is application software that is installed in the electronic device and is developed by a third party and not by a manufacturer of the electronic device; and run the third-party application software according to the first instruction.

9. The electronic device according to claim 8, wherein the processor is configured to: decrypt the currently displayed application software using a public key that is preconfigured by the manufacturer of the electronic device and corresponds to a private key of a signature of dedicated application software; and when a signature of the application software cannot be decrypted using the public key, determine that the application software is third-party application software, wherein the dedicated application software is application software developed by the manufacturer of the electronic device.

10. The electronic device according to claim 8, wherein the processor is configured to: convert the first touch event into a first event according to a preset rule, and acquire the first instruction corresponding to the first event.

11. The electronic device according to claim 10, wherein the processor is configured to:
receive a user-defined setting,
convert the first touch event into a user-defined first event, and
acquire the first instruction corresponding to the user-defined first event.

12. The electronic device according to claim 10, wherein the first event is a second touch event; the second touch event is input information that is triggered by a touch gesture on the second touch panel of the electronic device and is compatible with the interface of the third-party application software; and the processor is configured to:
convert the first touch event into the second touch event according to the preset rule, and
acquire the first instruction corresponding to the second touch event.

13. The electronic device according to claim 10, wherein the processor is configured to:
convert, according to the preset rule, an instruction triggered by the first touch event into an instruction that would be triggered by a physical button of the electronic device, to acquire the instruction that would be triggered by the physical button of the electronic device.

14. The electronic device according to claim 8, wherein the processor is further configured to:
acquire a third touch event, wherein the third touch event is input information that is triggered by a touch gesture on the second touch panel and is compatible with the interface of the third-party application software; and
run the third-party application software according to the first instruction and the third touch event.

15. An electronic device comprising:
a processor,
a memory,
an input device, and
an output device,
wherein the processor is configured to:
add a registration interface, wherein the registration interface is used for registration by application software that needs to use a first touch panel of the electronic device;
when the electronic device detects that a registration quantity is greater than or equal to 1, turning on the first touch panel; and
when the electronic device detects that a registration quantity is less than 1, turning off the first touch panel.

* * * * *